US008933903B2

(12) United States Patent
Baaijens et al.

(10) Patent No.: US 8,933,903 B2
(45) Date of Patent: Jan. 13, 2015

(54) CONTROLLING A COLOR VARIATION OF A COLOR ADJUSTABLE ILLUMINATION DEVICE

(75) Inventors: Johannes Petrus Wilhelmus Baaijens, Eindhoven (NL); Thomas Antonius Martinus Van Erp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 15 days.

(21) Appl. No.: 13/820,571

(22) PCT Filed: Sep. 5, 2011

(86) PCT No.: PCT/IB2011/053868
§ 371 (c)(1), (2), (4) Date: Mar. 4, 2013

(87) PCT Pub. No.: WO2012/032452
PCT Pub. Date: Mar. 15, 2012

(65) Prior Publication Data
US 2013/0162172 A1 Jun. 27, 2013

(30) Foreign Application Priority Data
Sep. 8, 2010 (EP) .................................... 10175716

(51) Int. Cl.
*G06F 3/041* (2006.01)
*H05B 37/02* (2006.01)
*H05B 33/08* (2006.01)

(52) U.S. Cl.
CPC ............ *H05B 37/02* (2013.01); *H05B 33/0863* (2013.01); *H05B 37/029* (2013.01)
USPC .......................................... 345/173; 315/292

(58) Field of Classification Search
CPC ............ H05B 37/0272; H05B 33/0863; G06F 3/0416
USPC ........................... 345/156, 173; 315/292, 311
See application file for complete search history.

(56) References Cited

U.S. PATENT DOCUMENTS 7,427,840 B2 * 9/2008 Morgan et al. ................ 315/295
8,373,366 B2 * 2/2013 Baaijens et al. .............. 315/312
8,427,721 B2 * 4/2013 Vinkenvleugel et al. ..... 358/520
(Continued)

FOREIGN PATENT DOCUMENTS

EP 2059093 A1 5/2009
WO 2006134529 A2 12/2006
(Continued)

*Primary Examiner* — Thuy Vinh Tran
(74) *Attorney, Agent, or Firm* — Meenakshy Chakravorty

(57) ABSTRACT

A method of generating a control signal for control of a color variation of a color adjustable illumination device, using a user interface (2) comprising a touch sensitive color wheel (3) with a hue that varies in a tangential direction and a saturation that varies in a radial direction, said method comprising the steps of: monitoring (401; 602) the touch sensitive color wheel (3) for user inputs; acquiring (402) a color path (5) input as a curve drawn on the touch sensitive color wheel (3) by a user; and generating (403) a control signal adapted to be received by a control unit (9) for controlling the color variation of the color adjustable illumination device, the control signal including information about the hue variation and the saturation variation of the acquired color path (5). This allows a user to create a lighting effect with a color variation in an intuitive way by drawing a color path as a curve on a touch sensitive color wheel.

14 Claims, 10 Drawing Sheets

(56) References Cited

U.S. PATENT DOCUMENTS

| | | | | |
|---|---|---|---|---|
| 8,456,100 | B2 * | 6/2013 | Baaijens | 315/291 |
| 2008/0259590 | A1 | 10/2008 | De Goederen-Oei | |
| 2009/0153352 | A1 | 6/2009 | Julio | |
| 2009/0174332 | A1 | 7/2009 | Sejkora | |
| 2010/0053198 | A1 | 3/2010 | Vinkenvleugel et al. | |
| 2010/0127638 | A1 * | 5/2010 | Lan et al. | 315/294 |
| 2010/0308755 | A1 * | 12/2010 | Van Liempd et al. | 315/363 |

FOREIGN PATENT DOCUMENTS

| | | | |
|---|---|---|---|
| WO | 2007085986 | A1 | 8/2007 |
| WO | 2008001289 | A2 | 1/2008 |
| WO | 2009024903 | A2 | 2/2009 |
| WO | 2009024903 | A3 | 2/2009 |

* cited by examiner

CONTROLLING A COLOR VARIATION OF A COLOR ADJUSTABLE ILLUMINATION DEVICE

FIELD OF THE INVENTION

The present invention relates to a method of generating a control signal for control of a color variation of a color adjustable illumination device. The invention also relates to a computer program and a remote control for implementing such a method, and to a lighting system comprising such a remote control.

BACKGROUND OF THE INVENTION

Nowadays, color adjustable light sources, such as light emitting diodes, combining red, green and blue light to achieve illumination of various colors are increasingly being used in, for example, households and commercial settings. As the use of color adjustable illumination devices has increased, also the demand for intuitive control of such illumination devices has increased, notably among users other than experts. For facilitating color control of light sources, such as LEDs with combined color output of red, green, and blue, US2009/0153352 teaches a lighting control system with a user interface for selection of hue and saturation. The user interface has a circular touchpad area with a color circle. The color circle has a hue that varies in a tangential direction of the color circle, and a saturation that varies in a radial direction of the color circle, from white at its center to fully saturated at its outer periphery. The lighting control system monitors the touchpad region for user inputs and when the color circle is touched, the lighting control system converts this contact into a corresponding hue and saturation to control the light fixture color.

Although this allows the user to select the color of the illumination, creation of more advanced lighting effects, such as a lighting effect with a spatial color gradient (i.e. an illumination where the color of the light changes over the illuminated area), or a lighting effect with a dynamically changing color (i.e. an illumination where the color of the light changes over time), is still relatively complicated and requires certain knowledge and skills. For example, creation of a spatial color gradient requires manual selection of the appropriate color for each of a plurality of light sources. To create a balanced color gradient with a smooth transition is a precise and tedious task, especially when a larger number (>3) of colors have to be defined. Therefore, creation of spatial color gradients has conventionally been performed by specially trained technicians. When it comes to dynamic color variation, a more user-friendly alternative for a non-trained user might be achieved by providing a set of predefined lighting effects that are pre-programmed into the lighting system. However, predefined lighting effects limit the freedom of selecting the color sequence of the lighting effect.

Hence, there is a need for a more intuitive way to control a color variation of a color adjustable illumination device.

SUMMARY OF THE INVENTION

According to an aspect of the invention, the above is at least partly achieved by means of a method of generating a control signal for control of a color variation of a color adjustable illumination device, using a user interface comprising a touch sensitive color wheel with a hue that varies in a tangential direction and a saturation that varies in a radial direction, the method comprising the steps of:

monitoring the touch sensitive color wheel for user inputs;

acquiring a color path input as a curve drawn on the touch sensitive color wheel by a user; and generating a control signal adapted to be received by a control unit configured to control the color variation of the color adjustable illumination device, said control signal including information about the hue variation and the saturation variation of the acquired color path.

The present invention is based on the insight that a lighting effect with a color variation can be created in an intuitive way by allowing the user to draw the color path as a curve on a touch sensitive color wheel. The hue variation and saturation variation indicated by the color path can then be used to control the color variation of the illumination device. This allows the user to easily try and evaluate different color paths through color space. The color variation of the color path can then be applied in a lighting effect, either as a variation in color over time, or as a variation in color over the illuminated area.

The method may further comprise the steps of: displaying the color path as a curve on the touch sensitive color wheel; and editing the color path in response to user inputs. The step of editing the color path may be selected from the group of: rotating the color path when a start point or end point of the curve is touched and dragged substantially perpendicularly to the curve; deforming the color path when a point on the curve, other than a start point or end point, is touched and dragged away from the curve; and performing a translation of the color path when the curve is simultaneously touched at two various points, and dragged over the touch sensitive color wheel. Editing of the color path by moving or deforming it over the color wheel provides an intuitive and user-friendly way to adjust or fine-tune the lighting effect.

According to another aspect of the invention, there is provided a computer program comprising a program code for performing the steps of any one of the above described embodiments of the method when the program is run on a control unit in a remote control device.

According to yet another aspect of the invention, there is provided a remote control for generating a control signal for control of a color variation of a color adjustable illumination device, the remote control comprising: a touch sensitive color wheel with a hue that varies in a tangential direction and a saturation that varies in a radial direction; a control unit configured to generate a control signal for control of a color variation of the color adjustable illumination device by performing the steps of any one of the above described embodiments of the method. The control unit may also include a transmitter for transmitting the control signal to a control unit configured to control the color variation of the color adjustable illumination device.

The touch sensitive color wheel may preferably be configured such that a transition between adjacently arranged colors is perceived as smooth by a viewer. Further, the order of the hues may preferably be selected such that a transition between adjacent hues is perceived as smooth by a viewer. This can be achieved by arranging the hues included in the color wheel in an order such that adjacent hues are the ones generally perceived as most similar by a viewer. One way to do this is to arrange the hues of the color wheel according to their order in the CIE 1931 x,y color space. Furthermore, a smooth saturation change can be achieved by a gradual increase in saturation in a radial direction. For example, the saturation of the color wheel may increase from white at its center to fully saturated at its outer periphery. This leads to more appealing lighting effects, as it has been found that viewers generally prefer smooth color transitions, either with smooth hue changes, smooth saturation changes, or a combined effect of smooth hue and saturation change. White here refers to a color point at or near the black body line of the CIE 1931 x,y color space.

The color wheel may preferably be circularly symmetric. However, in the context of this application, the term color wheel should not be construed as being limited to a circularly symmetric shape, but may refer to any two-dimensional region with a color spectrum having a hue that varies in a tangential direction and a saturation that varies in a radial direction. For example, the color wheel may have an elliptic shape or a polygonal shape.

Furthermore, the remote control according to the present invention may advantageously be included in a lighting system, further comprising a color adjustable illumination device, and a control unit for controlling a color variation of the color adjustable illumination device, based on a color path in a control signal received from the remote control.

The control unit of the lighting system may be configured to provide a lighting effect with a spatial color gradient, based on the color variation of the color path when the illumination device is operated in a first mode. A spatial color gradient is here intended to mean that the color of the light changes over the illuminated area.

According to an embodiment, the color adjustable illumination device may have a plurality of illuminating zones. An illuminating zone may be a separate luminaire, or an individually controllable segment within a luminaire, such as a segment or pixel in a wall-washer. The control unit of the lighting system may further be configured to create a spatial color gradient by selecting a set of points along the color path and assigning a hue and saturation of each of the selected points to a corresponding illuminating zone of the color adjustable illumination device. The selected points may be assigned to the illuminating zones in such a way that the relative order of the selected points corresponds to the relative order of the illuminating zones. The relative order of the illuminating zones may be pre-programmed during installation of the lighting system, or selected by wireless pointing, where the user points the remote control at the light sources one by one to indicate their relative order.

The selected points on the color path may preferably include the start point of the color path and the end point of the color path. Further, the selected points on the color path may be selected such that they divide the color path in segments of equal length. Thus, if there are only to illuminating segments, the start point and the end point of the color path may preferably be used.

The color adjustable illumination device may be configured to provide a lighting effect with a color that varies over time according to the color variation of the color path, when operated in a second mode.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention.

DETAILED DESCRIPTION

Figures 1, 2:
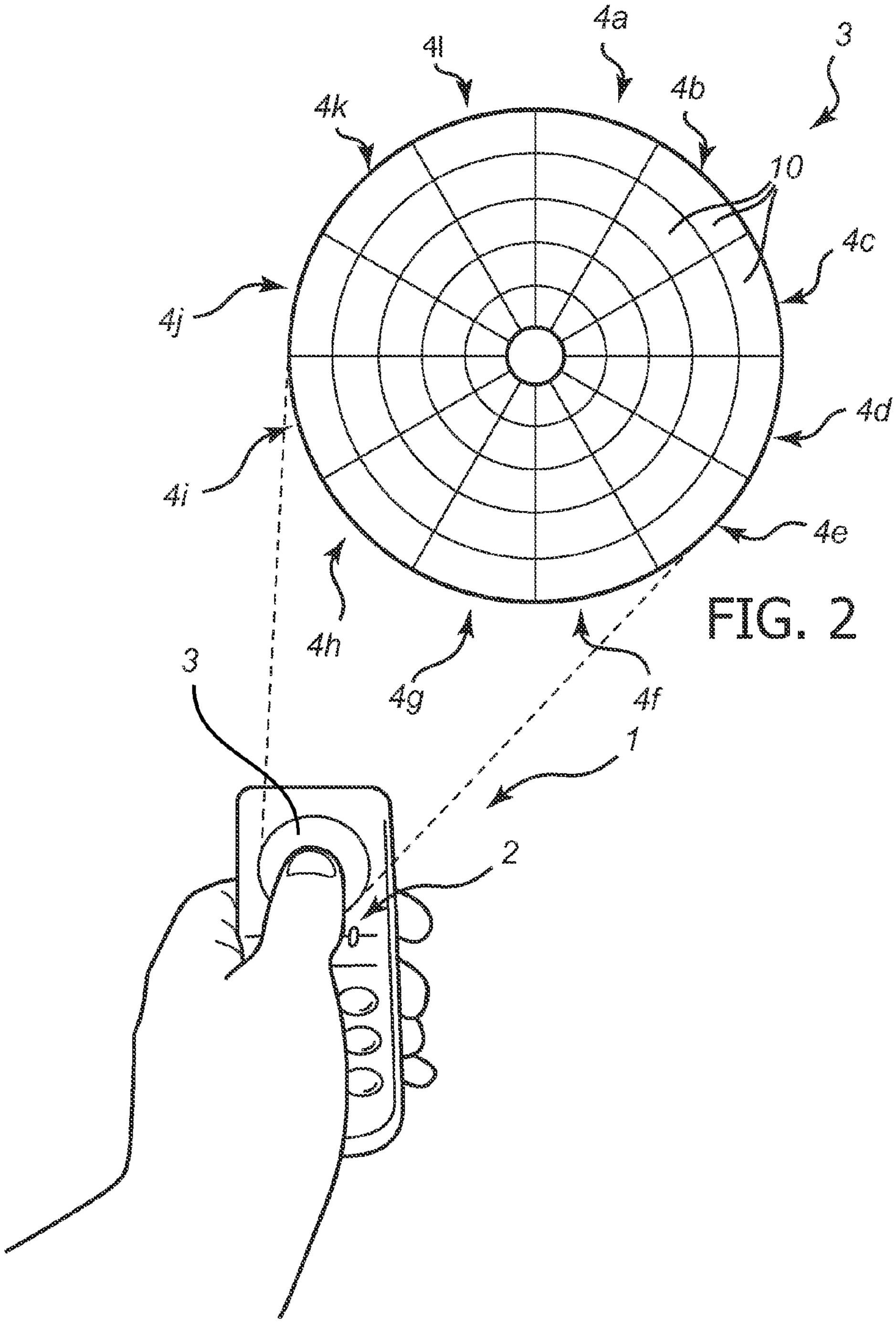
FIG. 1 is a schematic view of a remote control provided with a touch sensitive color wheel.
FIG. 2 is a schematic view of an exemplifying color wheel.

FIG. 1 illustrates a remote control 1 for generating a control signal for control of a color variation of a color adjustable illumination device. The remote control 1 comprises a user interface 2, a transmitter (not shown), and a control unit (not shown) connected to the user interface and the transmitter. The control unit may include a programmable device such as microprocessor, or microcontroller, and a computer executable code that controls the operation of the programmable device. Further, the user interface 2 includes a touch sensitive color wheel 3, which may be implemented as a touchpad with an integrated color spectrum graphic. The touchpad may be touch sensitive via sensing cells with capacitive measurement or electrical resistance measurement, and the color spectrum graphic may be a film, manufactured e.g. via a printing technique, adhered to the surface of the touchpad. The touch sensitive color wheel may also be implemented as a touch sensitive screen.

Before the color spectrum of the color wheel is further described, the terms hue and saturation used to identify a color are introduced. A color's hue may refer to one of the unique hues (i.e. red, green, or blue) or a combination of these unique hues (e.g. orange can be achieved by combining red and green), whereas saturation specifies how pure the color is. A fully saturated color has no white component in it. For example, pure red is fully saturated, pink is less saturated red, and white is the unsaturated color.

The color spectrum of the touch sensitive color wheel 3 is preferably arranged in such a way that the hue varies in a tangential direction, whereas the saturation varies in a radial direction. In the exemplifying color wheel illustrated in FIG. 2, this is achieved by dividing the circular area of the color wheel into a set of sectors 4*a-l*, and assigning a specific hue to each sector. The number of sectors, and thus the number of hues that are included in the color wheel, may vary. Further, the order of the hues is preferably selected such that a transition between hues in neighboring sectors is perceived as smooth by a viewer. This can be achieved by arranging the hues in an order such that adjacent hues are the ones that are generally perceived as most similar by a viewer. One way to do this is to arrange the hues of the color wheel according to the order in which they appear in the CIE 1931 x,y color space, which is a standard which is well-known to a person skilled in the art.

The exemplifying color wheel of FIG. 2 is a circle with twelve sectors 4*a-l*, each sector extending from the center of the color wheel to its periphery. The circumferential outer edge of the color wheel successively displays the following hues: yellow in sector 4*a*, variations of orange in sectors 4*b-d*, red in sector 4*e*, variations of magenta in sectors 4*f-h*, blue in sector 4*i*, variations of cyan in sectors 4*j-k*, and green in sector 4*l*. It is noted that the order of the hues corresponds to their order in the CIE 1931 x,y color space to provide a smooth transition between hues in neighboring sectors. Further, within each sector 4*a-l*, the saturation increases gradually from white (W) at the center of the color wheel to fully saturated at the outer periphery of the color wheel. This can be achieved by dividing each sector into sub-regions, so that the color wheel is divided into a set of color segments 10 each having a specific combination of hue and saturation. In the color wheel of FIG. 2 each sector includes five sub-regions (in addition to the center point) with a different degree of saturation. For example, red is fully saturated in the sub-region at the outer radius point of sector 4*e* and blends through pink in the intermediate sub-regions as the white center region is approached. Although the color wheel here has a set of large segments 10 with discrete colors, a more finely distributed set of colors may be used. Further, the boxes showing the boundaries of individual color segments 10 may be omitted.

The remote control 1 allows a user to select a color variation for use in a lighting effect by moving a finger over the touch sensitive color wheel 3. The curve traced out by the finger on the touch sensitive color wheel 3 indicates a sequence of points, each having an associated hue and saturation, referred to as a color path (e.g. in the exemplifying color wheel of FIG. 2 a color segment 10 may correspond to a point on the color path). When the finger is removed and subsequently again touches the touch sensitive color wheel, a new lighting effect can be created as a new color path.

Figure 3A:
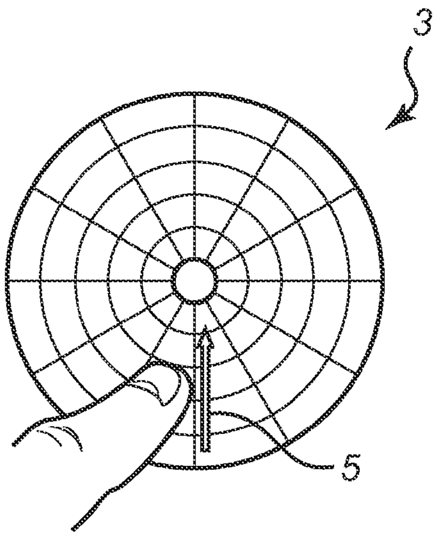
FIGS. 3*a-d* schematically illustrate examples of color paths drawn on the touch sensitive color wheel by a user.
Figure 3B:
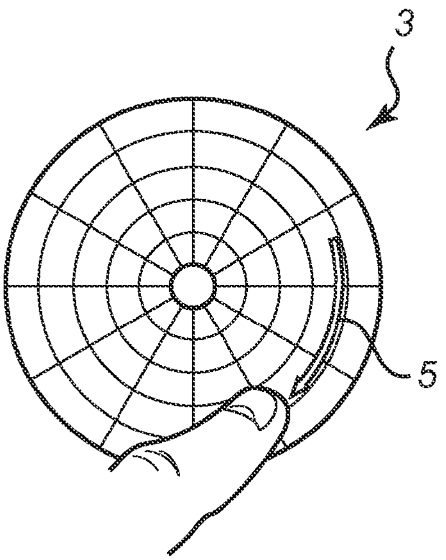
Figure 3C:
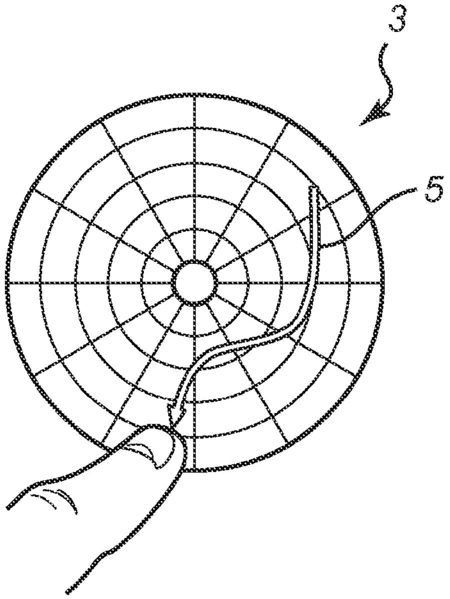
Figure 3D:
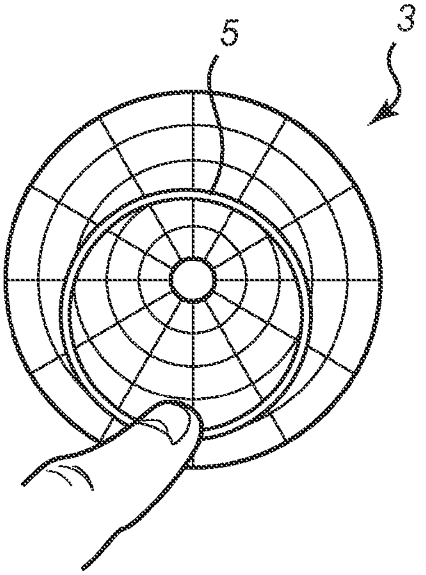

FIGS. 3*a-d* illustrate examples of curves drawn by a user on the touch sensitive color wheel 3 to create color paths 5. In FIG. 3*a* the curve is a straight line drawn within a sector, and extending from the periphery to the center of the color wheel. This color path 5 will result in a lighting effect with a saturation variation only. In FIG. 3*b* the curve is drawn at a constant distance to the center of the color wheel. This color path 5 will result in a lighting effect with a hue variation only. FIGS. 4*c-d* illustrate examples of color paths 5 having a variation in hue and saturation. It is noted that any shape of the color path is possible and it is not limited to examples shown.

Figure 4:
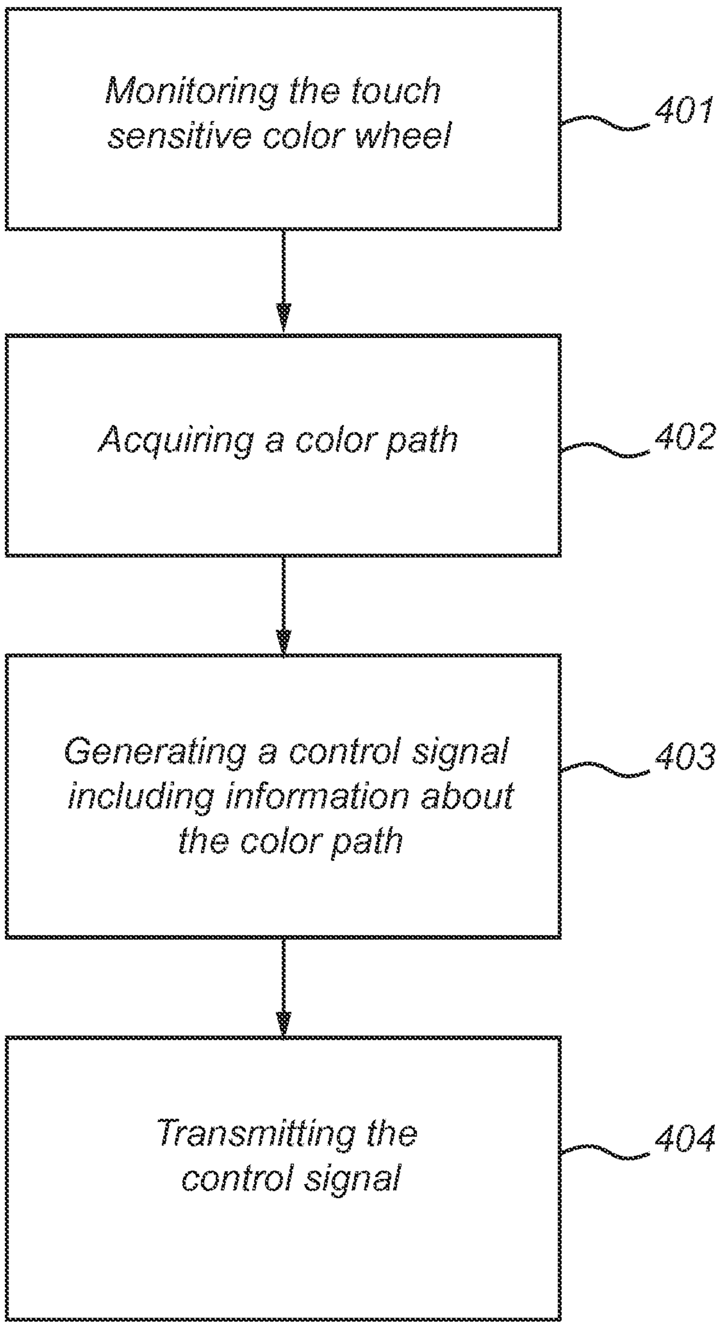
FIG. 4 is a flow chart of a method of controlling a color variation of a color adjustable illumination device.

In the following, the operation of the remote control of FIG. 1 will be described with reference to FIG. 4, which presents exemplifying steps for generating a control signal for control of a color variation of a color adjustable illumination device.

In a first step 401, the control unit of the remote control 1 monitors the touch sensitive color wheel 3 for user inputs.

In a second step 402, a color path is acquired as a curve 5 drawn by a user on the touch sensitive color wheel 3. The user may typically use his finger to draw the curve, although a stylus may also be used, depending on the type of touchpad. The curve drawn on the touch sensitive color wheel is registered by the sensing cells in the touchpad and is typically received by the control unit of the remote control as a set of x and y coordinates. The received x and y coordinates can then be converted by the control unit into a sequence of points, each having an associated hue and saturation, referred to as a color path, for example, via look up tables. The points may preferably be stored in a memory in the remote control as hue and saturation values in a device-independent color space, such as CIE 1931 x,y coordinates. The color path is typically recorded as long as the finger is touching the color wheel.

In a third step 403, the remote control 1 generates a control signal with information about the hue variation and the saturation variation of the acquired color path 5.

In a fourth step 404, the control signal is transmitted to a control unit 9 for controlling the color variation of the color adjustable illumination device.

Figure 5A:
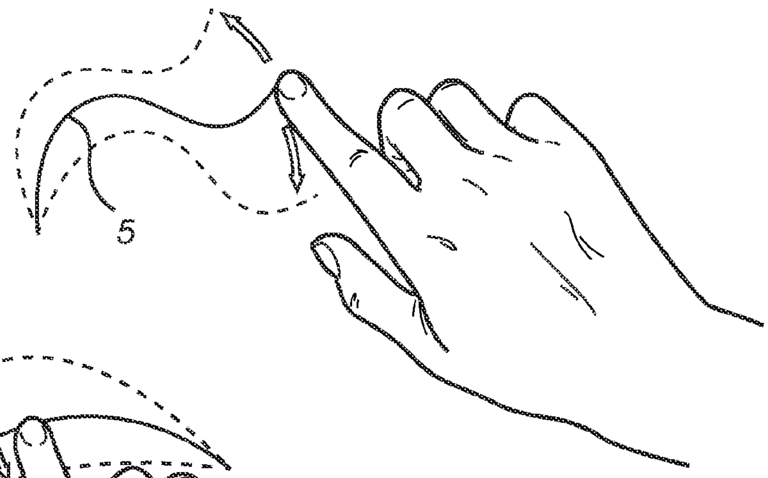
FIGS. 5*a-c* schematically illustrate the process of editing of a color path.
Figure 5B:
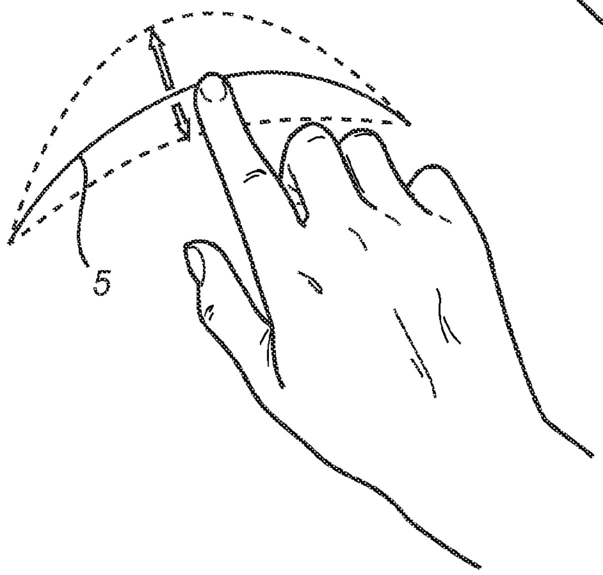
Figure 5C:
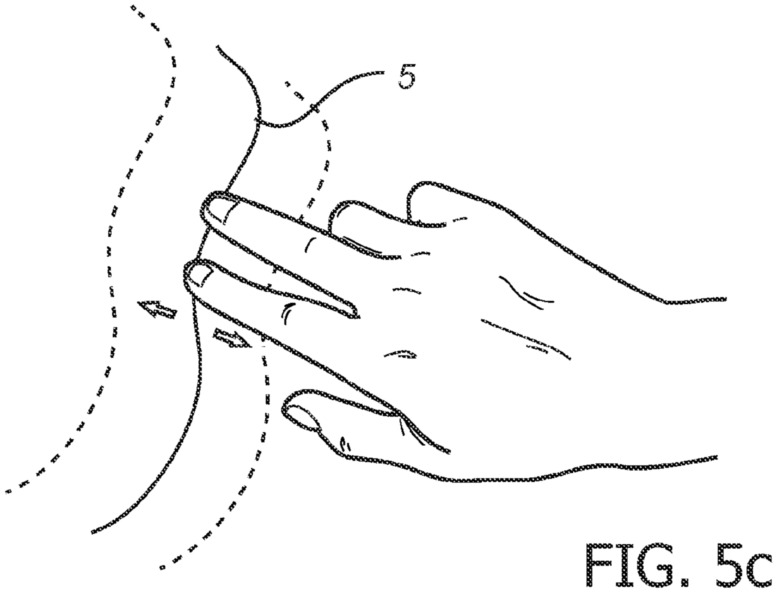

According to an embodiment of the present invention, the remote control may be operated in a mode that allows a user to edit the color path. Selection of this mode may be achieved e.g. by a control, such as a key or button, on the remote control. For example, the user may edit the color path by rotating the color path 5 as illustrated in FIG. 5*a*, thereby deforming the color path 5 as illustrated in FIG. 5*b*, or performing a translation of the color path 5 as illustrated in FIG. 5*c*. Editing allows the user to adjust or fine-tune the lighting effect in an intuitive and user-friendly way.

Figure 6:
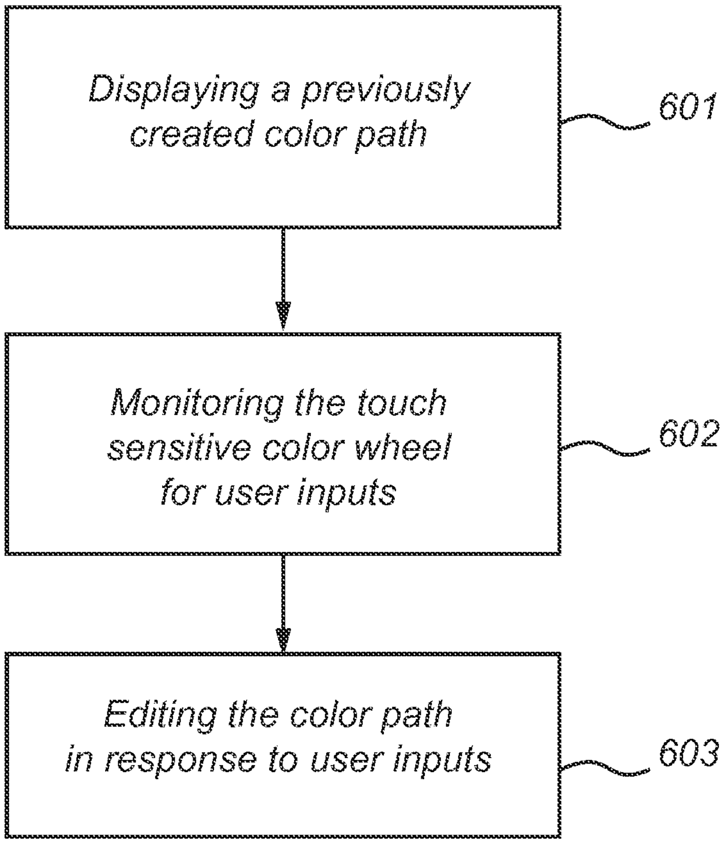
FIG. 6 is a flow chart of a method that allows a user to edit the color path.

In the following, the operation of the remote control of FIG. 1 in the editing mode will be described with reference to FIG. 6, which presents exemplifying steps for editing a color path.

In a first step 601, the remote control 1 displays a previously created color path 5 as a visible curve on the touch sensitive color wheel 3. For example, the color path can be visualized as a black curve.

In a second step 602, the control unit of the remote control 1 monitors the touch sensitive color wheel 3 for user inputs.

In a third step 603, the control unit of the remote control edits the color path 5 in response to the user inputs. The step of editing the color path may include the steps of: rotating the color path when a start or end point of the curve is touched and dragged substantially perpendicularly to the curve (as illustrated in FIG. 5*a*); deforming the color path when a point on the curve, other than an end point, is touched and dragged away from the curve (as illustrated in FIG. 5*b*); and performing a translation of the color path when the curve is simultaneously touched at two various points, and dragged over the touch sensitive color wheel (as illustrated in FIG. 5*c*).

Further, to enable a versatile remote control, the remote control may preferably comprise a selector, such as a push button, switch or slider, for changing between an operating mode where a lighting effect with a dynamic color variation is created and an operating mode where a lighting effect with a spatial color variation is created.

A dynamic color variation should be understood as a lighting effect where the hue and/or saturation of the light changes over time, but is substantially uniform in space at every instant, whereas a spatial color variation should be understood as a lighting effect where the hue and/or saturation of the light varies over the illuminated area, but is substantially constant over time.

In the following, operation in the dynamic mode will be described with reference to FIG. 7, which presents an exemplifying lighting system, and to FIG. 8, which presents exemplifying steps for controlling the illumination of a color adjustable illumination device to create a dynamic color variation.

Figure 7:
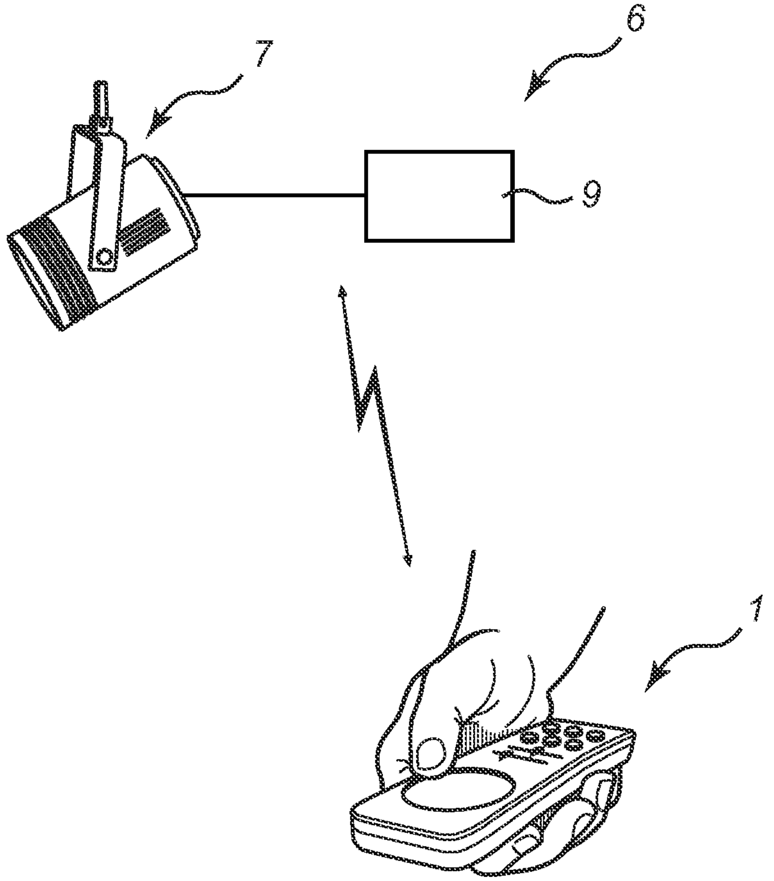
FIG. 7 is a schematic view of a lighting system according to an embodiment of the invention.
Figure 8:
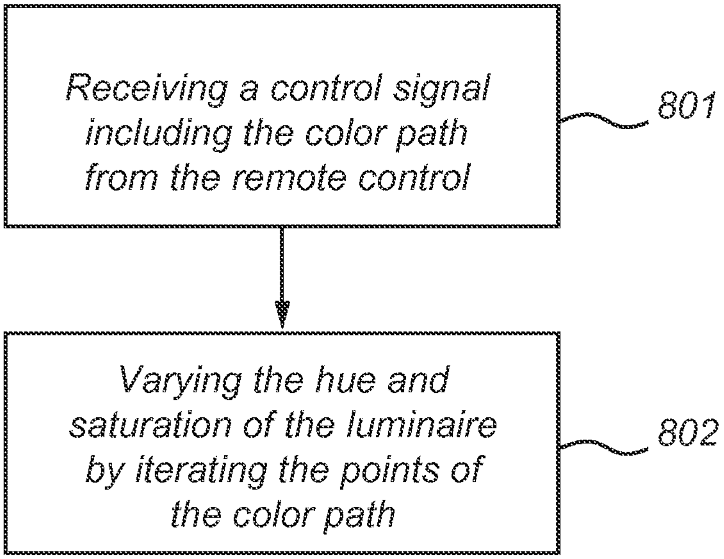
FIG. 8 is a flow chart of a method of providing a dynamic lighting effect based on a color path.

The lighting system 6 of FIG. 7 includes the remote control 1 of FIG. 1, a color adjustable illumination device 7, a receiver for receiving a control signal from the remote control, and a control unit 9 connected to the receiver and the illumination device. The control unit 9 may include a programmable device such as microprocessor, or microcontroller, and a computer executable code that controls the operation of the programmable device. Further, although the color adjustable illumination device 7 used here is a single color adjustable luminaire, such as an RGB, RGBW or RGBA spot, the lighting system may include more than one luminaire.

In a first step 801, the control unit 9 of the lighting system 6 receives a control signal (e.g. via wireless transmission) including the color path and information about the operating mode from the remote control 1. To be able to control various types of luminaires, information about the hue and saturation contained in the control signal may preferably be represented by a reference to a device-independent color space, such as the CIE 1931 x,y color space.

In a second step 802, the control unit 9 of the lighting system 6 varies the hue and/or saturation of the light from the color adjustable luminaire by iterating the points of the color path 5. This can be achieved as follows. First, hue and saturation of the luminaire are set to the hue and saturation associated with the start point of the color path, i.e. the hue and saturation associated with the point on the touch sensitive color wheel where the user began drawing the color path. The illumination color may be set by transforming the color point to dimming levels for each primary color of the color mixing light source (e.g. dimming levels for red, green and blue in an RGB mixing luminaire). The transformation of colors from a device-independent color space (e.g. CIE 1931 x,y) to a device-dependent three color mixing RGB system is generally known to persons skilled in the art. The control unit 9 of the lighting system then continues by iterating (preferably all) subsequent points of the color path 5 sequentially. If the color path is not closed, the iteration may continue by reversing direction and going back along the color path when the end point of the color path is reached (the direction may then be reversed again when the start point is reached, and so on). By iterating along the color path, the hue and saturation of the light from the color adjustable luminaire will be varied over time according to the color path created by the user. Accordingly, a dynamic lighting effect will appear on the illuminated surface.

The control unit 9 of the lighting system may move to the next point of the color path at regular intervals, meaning that the luminaire will emit light based on each point of the color path equally long. Further, the remote control may have a control element, such as a knob, push button or slider, allowing the user to vary the speed of the dynamic effect, i.e. the length during which light based on each color point of the color path is emitted. In some applications, the quality of the dynamic lighting effect may be improved by not showing each color in the sequence equally long. Instead a multiplication factor larger or smaller than one can be used, such that certain hues are shown longer and other hues are shown shorter. This can be used to compensate for history effects on the perception of color. Depending on the previous hue, the perception of the new hue can be distorted, e.g. appear less colorful for example, which can be compensated by showing the new color for some longer time. Further, if the number of discrete hues included in the color wheel is low, interpolation can be used between the different subsequent hues to obtain a smoother transition. This can be done by linear interpolation in the device-dependent RGB (RGBW, TGBA) space or in another color space (e.g. the CIE 1931 x,y space) from which the device-dependent light settings are calculated. It is noted that although the above control procedure has been described in relation to a single luminaire, it can also be applied to a plurality of individually controllable luminaires by transmitting synchronized control signals that refer to the same point on the color path (i.e. having the same hue and saturation) to all luminaires.

Figure 9:
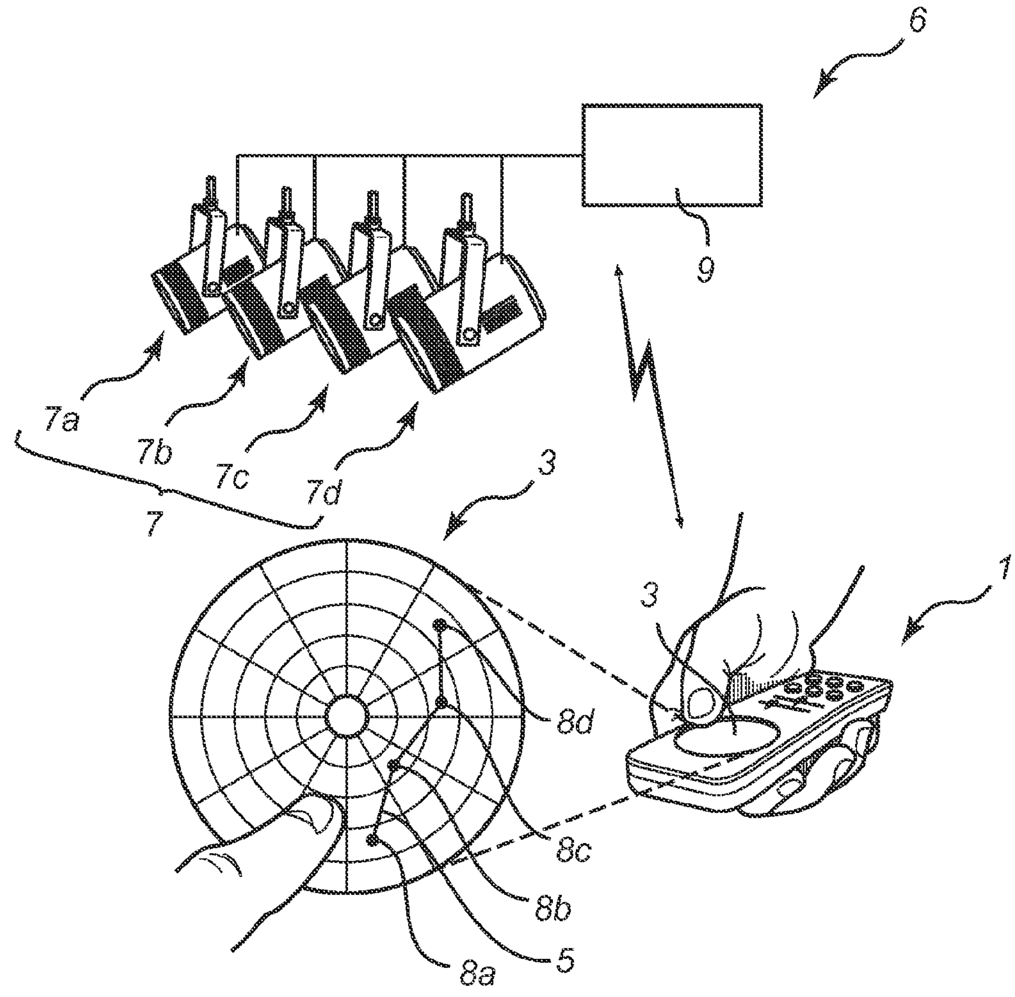
FIG. 9 is a schematic view of a lighting system according to another embodiment of the invention.

FIG. 9 illustrates a lighting system 6 comprising the remote control 1 of FIG. 1, a color adjustable illumination device 7 having a plurality of individually controllable illuminating zones 7*a-d*, and a control unit 9 for controlling the illumination of the illuminating zones. The individually controllable illuminating zones used here are implemented as separate luminaires 7*a-d*, such as color adjustable RGB spots, but the illuminating zones may also be implemented as individually controllable light segments in a single luminaire, such as segments or pixels in a wall-washer. Further, a relative order of the illuminating zones 7*a-d*, i.e. the relative order in which the luminaires are controlled, may be pre-programmed during installation of the lighting system, or subsequently selected by a user e.g. by wireless pointing, where the user points the remote control 1 at the luminaires 7*a-d* one at a time to indicate their relative order.

Figure 10:
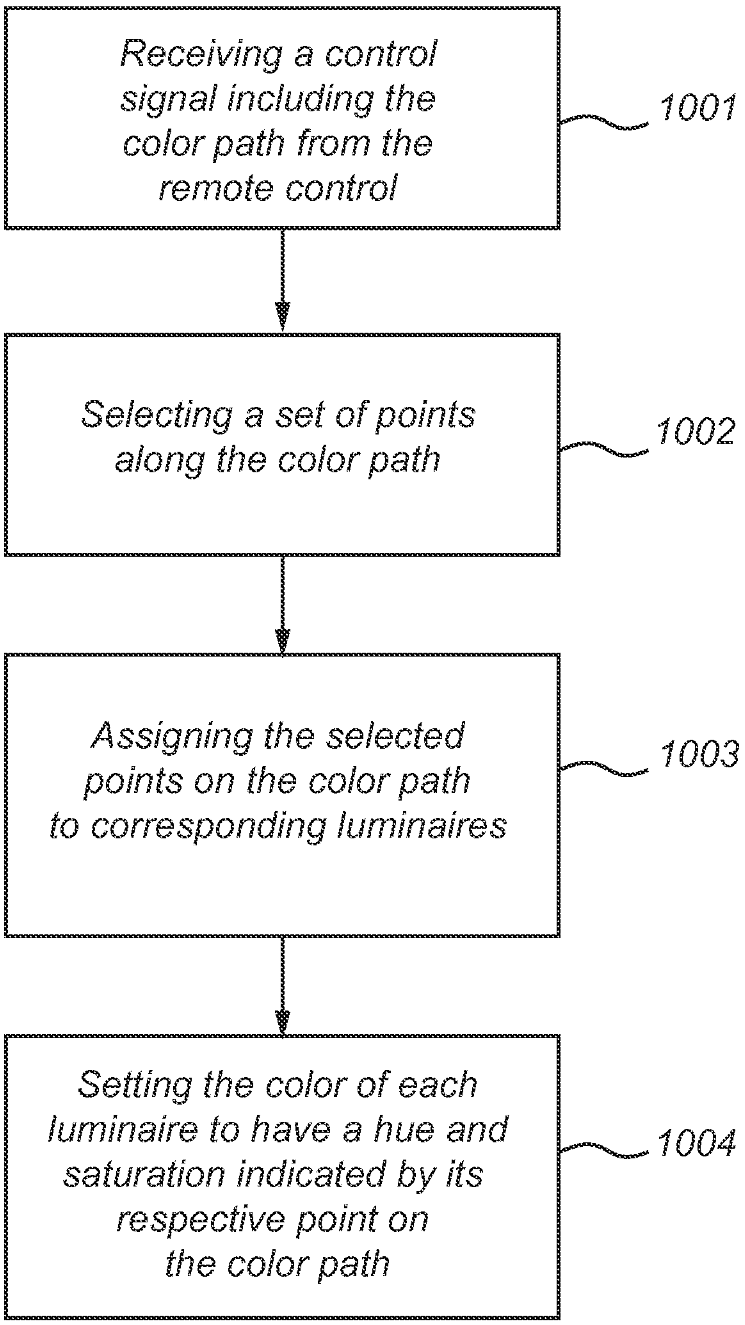
FIG. 10 is a flow chart of a method of providing a lighting effect with a spatial color gradient, based on a color path.

In the following, the operation of the lighting system of FIG. 9 in the spatial mode will be described with reference to FIG. 10, which presents exemplifying steps for controlling the illumination of a color adjustable illumination device to create a spatial color variation.

In a first step 1001, the control unit 9 of the lighting system 6 receives a control signal (e.g. via wireless transmission) including a color path 5 and information about the operating mode from the remote control 1. To be able to control various types of luminaires, information about the hue and saturation contained in the control signal may preferably be represented by a reference to a device-independent color space, such as the CIE 1931 x,y color space.

In a second step 1002, the control unit 9 of the lighting system selects a set of points 8*a-d* along the color path 5. The number of points selected typically corresponds to the number of color adjustable luminaires (or individually controllable light segments). Thus, as the number of luminaires 7*a-d* in the exemplifying lighting system in FIG. 9 is four, four points 8*a-d* are selected along the color path 5. The points are preferably selected in such a way that they divide the color path in segments of equal length and include the start point 8*a* and the end point 8*d* of the color path.

In a third step 1003, the selected points 8*a-d* on the color path are assigned to corresponding luminaires 7*a-d* in such a way that the relative order of the selected points corresponds to the relative order of the luminaires. Thus, in the exemplifying lighting system in FIG. 9, the start point 8*a* of the color path (i.e. where the user began drawing the color path) is assigned to the first light source 7*a*, the second point 8*b* along the color path is assigned to the second light source 7*b*, the third point 8*c* along the color path is assigned to the third light source 7*c*, and the end point 8*d* of the color path (i.e. where the user stopped drawing the color path) is assigned to the fourth light source 7*d*.

In a fourth step 1004, the color of each luminaire 7*a-d* is set to have a hue and saturation indicated by its respective point 8*a-d* on the color path 5. This can be achieved by transforming the color point to dimming levels for each primary color of the color mixing light source (e.g. dimming levels for red, green and blue in an RGB mixing luminaire).

Accordingly, after the color path 5 has been applied to the color adjustable light sources 7*a-d*, the color adjustable illumination device 7 illuminates the illuminated area with a lighting effect having a spatial color gradient.

According to an alternative embodiment, the selection of points along the color path can be set based on the distances between the luminaires, so that luminaires that are more closely spaced get a smaller color difference than luminaires that are further apart. The distances between the luminaires can be pre-programmed during installation, or if the luminaires are connected via a wireless network (e.g. RF systems like ZigBee), the distances between luminaires can be measured via "time of flight" measurement or via "ultra sound" signals. It may also be possible to include a distance sensor in the remote control that allows the distance between the light sources to be measured.

Figure 11:
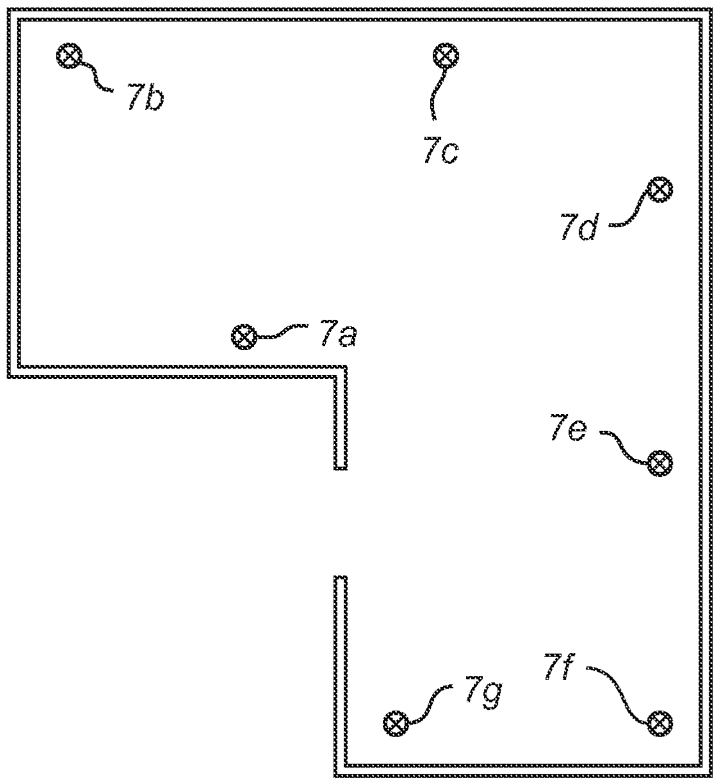
FIG. 11 is a schematic view of a lighting system according to yet another embodiment of the invention.

FIG. 11 illustrates a lighting system where a plurality of light sources 7*a-g* are arranged to illuminate the walls of a room. However, sometimes the beginning and the end of the preset relative order of the luminaires may not be optimal for the spatial color gradient that is created with the remote control. Therefore, the remote control may include a "previous/next"-button that allows the user to rotate the color gradient along the cyclic order of the luminaires, so that the user can fine-tune the spatial position of start and end points of the color gradient. A step with the "next" button on the remote control results in the neighboring luminaire being selected either in clockwise or anti-clockwise direction.

The person skilled in the art realizes that the present invention is by no means limited to the preferred embodiments described above. On the contrary, many modifications and variations are possible within the scope of the appended claims. For example, although the remote control used here has been described as a hand-held stand-alone user interface device, the invention may also be implemented in a wall-mounted control unit, or in a PDA (e.g. as an application on a smart phone). Further, although the color wheel used here has been described as circularly symmetric, it is recognized that the color wheel may also have other shapes, such as an elliptic shape or a polygonal shape. Furthermore, although information about the hue and saturation contained in the control signal has here been represented by a reference to a device-independent color space, such as the CIE 1931 x,y color space, it is also possible, that the RGB dimming levels are stored in the remote control for each color of the color wheel, and that these RGB values are sent to the luminaire.

The invention claimed is:

1. A method of generating a control signal for control of a color variation of a color adjustable illumination device, using a user interface comprising a touch sensitive color wheel with a hue that varies in a tangential direction and a saturation that varies in a radial direction, said method comprising the steps of:

monitoring the touch sensitive color wheel for user inputs;

acquiring a color path input as a curve drawn on the touch sensitive color wheel by a user, wherein said acquired color path comprises a sequence of more than one point, each point of said sequence connected to at least one other point and having an associated hue and saturation, wherein said hue varies from one point to another when the curve is drawn in a tangential direction and said saturation varies from one point to another when the curve is drawn in a radial direction; and generating a control signal adapted to be received by a control unit configured to control the color variation of the color adjustable illumination device, said control signal including information about hue variation and saturation variation of the acquired color path.

2. The method according to claim 1, further comprising the steps of:

displaying the color path as a curve on the touch sensitive color wheel; and editing the color path in response to the user inputs.

3. The method according to claim 2, wherein the step of editing the color path is selected from the group consisting of:

rotating the color path when an end point of the curve is touched and dragged substantially perpendicularly to the curve;

deforming the color path when a point on the curve, other than an end point, is touched and dragged away from the curve; and performing a translation of the color path when the curve is simultaneously touched at two various points, and dragged over the touch sensitive color wheel.

4. A remote control for generating a control signal for control of a color variation of a color adjustable illumination device, said remote control comprising:

a touch sensitive color wheel configured to acquire a color path input as a curve drawn on the touch sensitive color wheel by a user, wherein said acquired color path comprises a sequence of more than one point, each point of said sequence connected to at least one other point and having an associated hue and saturation, wherein said hue varies from one point to another when the curve is drawn in a tangential direction and said saturation varies from one point to another when the curve is drawn in a radial direction;

a control unit configured to generate a control signal for control of a color variation of the color adjustable illumination device, said control signal including the information about hue variation and saturation variation of said acquired color path.

5. The remote control according to claim 4, wherein the touch sensitive color wheel is configured such that a transition between adjacently arranged colors is perceived as smooth by a viewer.

6. The remote control according to claim 4, wherein the hues included in the color wheel are arranged in an order such that adjacent hues are the ones generally perceived as most similar by a viewer.

7. The remote control according to claim 4, wherein the hues included in the color wheel are arranged in an order corresponding to their order in the CIE 1931 x,y color space.

8. The remote control according to claim 4, wherein the saturation of the color wheel increases from white at its center to fully saturated at its outer periphery.

9. A lighting system comprising:

a color adjustable illumination device;

and a remote control for generating a control signal for control of a color variation of a color adjustable illumination device, said remote control comprising:

a touch sensitive color wheel configured to acquire a color path input as a curve drawn on the touch sensitive color wheel by a user, wherein said acquired color path comprises a sequence of more than one point, each point of said sequence connected to at least one other point and having an associated hue and saturation, wherein said hue varies from one point to another when the curve is drawn in a tangential direction and said saturation varies from one point to another when the curve is drawn in a radial direction;

a control unit configured to generate a control signal for control of a color variation of the color adjustable illumination device, said control signal including the information about hue variation and saturation variation of said acquired color path.

10. The lighting system according to claim 9, wherein the control unit of the lighting system is configured to provide a lighting effect with a spatial color gradient based on the color variation of the color path, when operated in a first mode.

11. The lighting system according to claim 9, wherein the color adjustable illumination device has a plurality of illuminating zones, wherein the control unit of the lighting system is configured to create a spatial color gradient by selecting a set of points along the color path and assigning a hue and saturation of each of the selected points to a corresponding illuminating zone of the color adjustable illumination device.

12. The lighting system according to claim 9, wherein the selected points on the color path include the start point and end point of the color path.

13. The lighting system according to claim 9, wherein the selected points on the color path are selected such that they divide the color path in segments of equal length.

14. The lighting system according to claim 9, wherein the control unit of the lighting system is configured to provide a lighting effect with a color that varies over time according to the color variation of the color path, when operated in a second mode.

* * * * *